C. A. DEVERO.
TIRE SETTING MACHINE.
APPLICATION FILED NOV. 2, 1911.
1,026,975.
Patented May 21, 1912.
2 SHEETS—SHEET 1.
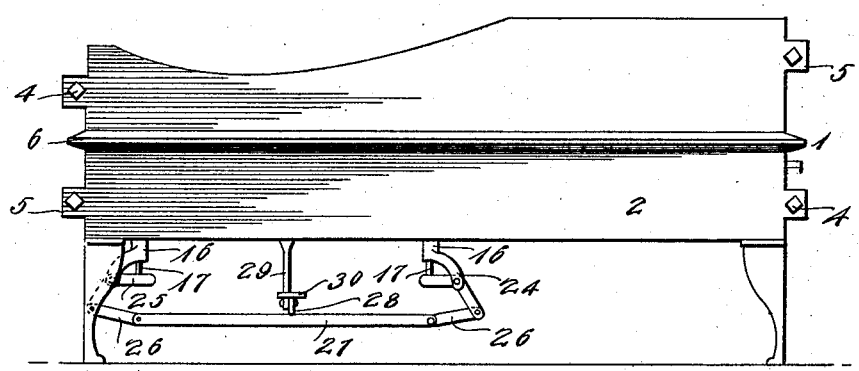
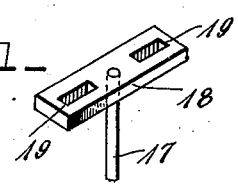
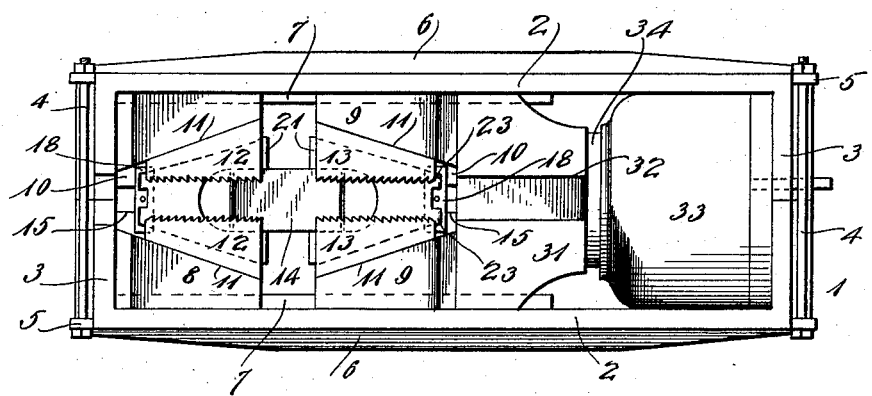
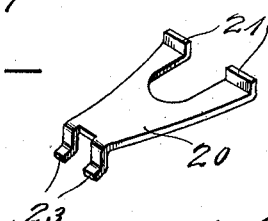
Witnesses
J. R. Pierce
C. E. Hunt
Inventor
C. A. Devero.
by H. B. Willson & Co.
Attorneys
COLUMBIA PLANOGRAPH CO., WASHINGTON, D. C.

C. A. DEVERO.
TIRE SETTING MACHINE.
APPLICATION FILED NOV. 2, 1911.
1,026,975.
Patented May 21, 1912.
2 SHEETS—SHEET 2.
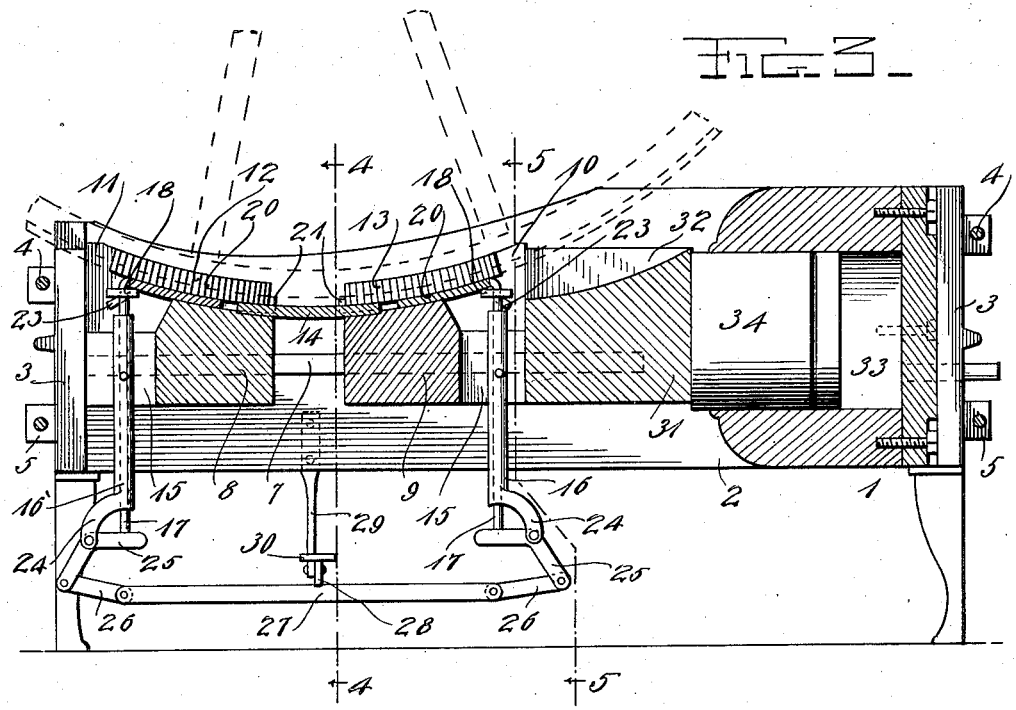
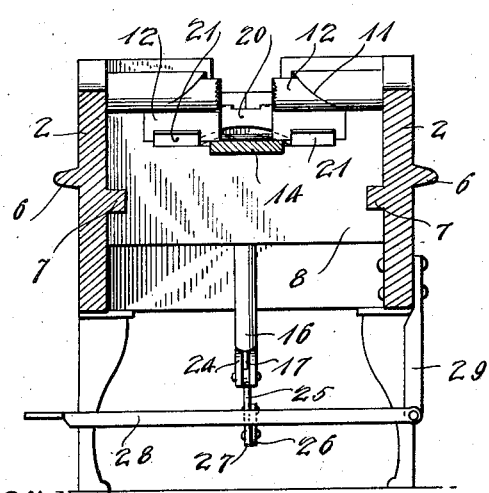
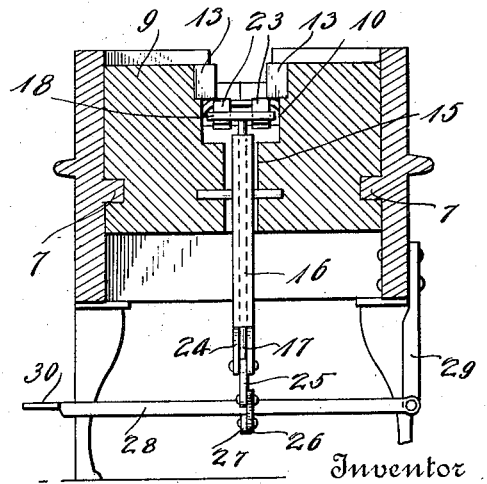
Witnesses
J. R. Pierce
C. E. Hunt
Inventor
C. A. Devero.
by H. P. Willson & Co.
Attorneys

UNITED STATES PATENT OFFICE.

CHARLES A. DEVERO, OF KEOKUK, IOWA, ASSIGNOR TO KEOKUK HYDRAULIC TIRE SETTER COMPANY, A CORPORATION.

TIRE-SETTING MACHINE.

1,026,975.

Specification of Letters Patent. Patented May 21, 1912.

Application filed November 2, 1911. Serial No. 658,143.

*To all whom it may concern:*

Be it known that I, CHARLES A. DEVERO, a citizen of the United States, residing at Keokuk, in the county of Lee and State of Iowa, have invented certain new and useful Improvements in Tire-Setting Machines; and I do declare the following to be a full, clear, and exact description of the invention, such as will enable others skilled in the art to which it appertains to make and use the same.

This invention relates to improvements in machines for shrinking or setting cold tires.

One object of the invention is to improve the tire setter shown in my allowed United States application, Serial No. 602,330 filed January 12, 1911, whereby a stronger, more durable and efficient operating mechanism is provided for actuating the tire gripping members of the machine.

With this and other objects in view, the invention consists of certain novel features of construction, and the combination and arrangement of parts as will be more fully described and claimed.

In the accompanying drawings; Figure 1 is a side view of my improved tire setter; Fig. 2 is a top plan view; Fig. 3 is an enlarged central vertical longitudinal section thereof; Fig. 4 is a cross sectional view on the line 4—4 of Fig. 3; Fig. 5 is a similar view on the line 5—5 of Fig. 3; Fig. 6 is a detail perspective view of one of the gripping block supporting and operating plates; Fig. 7 is a detail perspective view of the upper end of one of the devices for actuating the block operating plates.

Referring more particularly to the drawings, 1 denotes the supporting frame or casing comprising longitudinal side plates 2 and right angular end plates 3. The side and end plates of the device are clamped together by tie bolts 4 which are engaged with apertured lugs 5 on the side plates as shown. On the outer surfaces of the sides and ends of the frame are formed centrally disposed ribs 6 whereby the plates are braced and strengthened. On the inner sides of the side plates 2 are formed longitudinally disposed guiding and supporting ribs 7 the purpose of which will be hereinafter described.

Arranged in the frame 1 and slidably supported on the ribs 7 are oppositely disposed head blocks 8 and 9 having in their upper sides recesses 10, the vertical inner walls 11 of which are formed at inclinations to the side wall as clearly shown in Fig. 2 of the drawings. The recesses thus formed between the inclined walls 11 of the blocks taper or decrease in width from the inner toward the outer ends of the block as shown. Loosely mounted in the recesses 10 of the head blocks 8 and 9 are pairs of tire gripping blocks 12 and 13 having inclined outer sides which engage the angular or tapered side walls 11 of the recesses 10 in the blocks 8 and 9. The lower walls of the recesses 10 and the gripping blocks 12 and 13 are formed on a curve or arc of a circle to conform substantially to the curvature of the rim and tire of the wheel. Between the head blocks 8 and 9 and having its opposite ends engaged in the recesses 10 thereof is a curved wheel supporting plate 14 on which the wheel rests when in the machine.

In the outer ends of the blocks 8 and 9 are formed vertical centrally disposed recesses 15 in which are pivotally mounted vertically disposed tubular block adjusting levers 16 in which are slidably mounted block lifting rods 17 the lower ends of which extend a short distance below the lower ends of the tubular levers 16 while the upper ends of said rods project above said levers and have secured thereto heads 18 provided with slots 19, see Fig. 7, said lever 16 and rods 17 forming compound oscillating and sliding levers. Slidably mounted between the curved upper surface of the head blocks 8 and 9 and the curved lower surface of the gripping blocks 12 and 13 are block adjusting plates 20, shown in detail in Fig. 6, said plates having inclined or tapered side edges and having their inner ends bifurcated and bent upwardly to form block engaging lugs 21 which engage the inner ends of the blocks 12 and 13 as shown in Fig. 2. The opposite or outer ends of the plates 20 are also bifurcated and bent downwardly and outwardly to form plate attaching lugs 23 which are engaged with the slots 19 in the heads 18 on the rods 17 of the adjusting levers.

On the lower ends of the tubular block adjusting levers 16 are formed oppositely projecting bearing brackets 24 in which are pivotally mounted bell crank levers 25, the upper arms of which are engaged with the lower arms of the rods 17 as clearly shown in Fig. 1 and 3 of the drawings. The lower ends of the levers 25 are connected by short links 26 to an operating bar 27 disposed beneath the machine with which bar 27 is adapted to be engaged an operating lever 28 one end of which is pivoted to a depending bracket 29, while on the opposite end thereof is arranged a treadle 30 whereby said lever and the bar 27 may be depressed by the foot of the operator.

When the foot lever 28 and the operating bar 27 are depressed, the bell crank levers 25 will be rocked in the proper direction for forcing the rods 17 upwardly in the tubular levers 16 thus lifting the outer ends of the plates 20 and the gripping blocks into engagement with the tire of the wheel. After the blocks have thus been lifted, a further downward pressure on the foot lever 28 and bar 27 will swing the lower ends of the levers 16 inwardly and their upper ends outwardly thus drawing the block adjusting plates 20 outwardly on the head blocks. This operation of the adjusting plates 20 will also draw the tire gripping blocks 12 and 13 outwardly in the tapered recesses 11 of the head blocks 8 and 9 which operation, owing to the tapered formation of the recesses 11 and the inclined outer sides of the gripping blocks will force the latter into operative engagement with the edges of the tire whereby the latter is firmly gripped and secured to the head blocks 8 and 9. By providing the adjusting means for the tire gripping blocks, the latter may be brought into operative engagement with tires of different widths whereby the tires may be shrunk by a suitable operating mechanism hereinafter described.

The head block 8 at the forward end of the frame rests against the corresponding end plate 3 thereof, while the outer end of the opposite head block 9 is engaged by a compression or follower block 31 in the top of which is formed a centrally longitudinally disposed groove 32 to receive the portion of the wheel projecting beyond the outer end of the head block 9. The follower block 31 has in its opposite sides longitudinal channels whereby the block is slidably engaged with the ribs 7. Arranged in the rear end of the frame is a fluid pressure cylinder 33, in the inner end of which is slidably mounted a piston 34, the outer end of which engages the adjacent end of the compression or follower block 31, whereby, when the piston is forced out of the cylinder, the block 31 will be actuated and the pressure of the piston applied therethrough to the head block 9, whereby the gripping blocks 13 of this head block are forced into firm engagement with the adjacent edges of the tire. When the gripping blocks 13 of the head block 9 with which the follower block is engaged act on the tire, the latter is moved with the head block 9 and this movement of the tire will be imparted to the gripping blocks 12 of the head 8 in the forward end of the frame, thereby forcing said gripping blocks 12 between the angular walls 11 of the recess 10 in the block 8 and causing these blocks to firmly grip and hold the tire against the pressure exerted thereon by the piston through the opposing head block 9 and gripping blocks 13, thereby shrinking and setting the tire.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:—

1. In a tire setting machine, a pair of head blocks, tire gripping blocks slidably mounted on said head blocks, tubular levers pivotally mounted in said blocks and rods slidably mounted in said tubular levers and engaging said gripping blocks whereby the latter are brought into position to grip the tire, and means whereby the rods are raised and said levers are oscillated.

2. In a tire setting machine, a pair of head blocks, tire gripping blocks slidably mounted on said head blocks, operating levers pivotally mounted in said head blocks, rods carried by said levers slidable with relation thereto and having operative engagement with said gripping blocks, bell crank levers pivoted to said operating levers and having one arm of each engaging the end of its corresponding slidable rod, and means whereby said bell crank levers are simultaneously rocked to raise the slidable rods and rock the operating levers.

3. In a tire setting machine, a pair of head blocks, pairs of tire gripping blocks having a sliding engagement with said head blocks, block supporting and adjusting plates operatively connected with said gripping blocks whereby the latter are adjustably supported, grip operating levers pivotally mounted in said head blocks, grip adjusting rods having a sliding engagement with said grip operating levers and having an operative connection at their upper ends with said block supporting and adjusting plates, bell crank levers having an operative engagement with the lower ends of said rods whereby the latter and the block adjusting plates are lifted to bring said gripping blocks into position to engage the tire of the wheel, a connecting bar having a loose connection at its ends with said bell crank levers, and a pivotally mounted foot lever adapted to be engaged with said connecting rod whereby the latter is depressed and said bell crank levers thus operated to first actuate said plate adjusting rods and then said block operating levers.

4. In a tire setting machine, a frame, a pair of head blocks slidably mounted therein, said blocks having in their upper sides tapered recesses, pairs of gripping blocks slidably mounted in the recesses of said head blocks, said gripping blocks having tapered outer edges adapted to coact with the tapered sides of the recesses in the head blocks whereby when said gripping blocks are adjusted longitudinally in one direction the same will be brought together into operative engagement with the edges of the tire and compound oscillating and sliding levers engaging said gripping blocks whereby they are adjusted vertically and moved longitudinally in said head blocks.

5. In a tire setting machine, a frame, a pair of head blocks having in their upper sides tapered recesses, gripping blocks slidably mounted in the recesses of said head blocks, gripping block supporting plates arranged in the recesses of said head blocks, block engaging lugs formed on the inner ends of said plates, attaching lugs formed on the outer ends thereof, tubular block operating levers pivotally mounted in said head blocks, block adjusting rods slidably mounted in said tubular levers, heads arranged on the upper ends of said rods and having an operative engagement with the attaching lugs on said plates, bell crank levers pivotally mounted on the lower ends of said tubular levers and having an operative engagement with the lower ends of said block adjusting rods whereby when said bell crank levers are actuated, said rods will be forced upwardly and the plates and gripping blocks thereby lifted into position to engage the tire of the wheel, a lever operating mechanism connected with said bell crank levers whereby the latter are first actuated to lift said adjusting rods and whereby after said rods have been actuated, said block operating levers will be actuated to shift said gripping blocks longitudinally in the tapered recesses of the head blocks and thereby operatively engage said gripping blocks with the edges of the tire, and means whereby said head blocks and said gripping mechanism is shifted to shrink the tire.

In testimony whereof I have hereunto set my hand in presence of two subscribing witnesses.

CHARLES A. DEVERO.

Witnesses:
C. L. DOLLERY,
C. A. VOLLERS.

Copies of this patent may be obtained for five cents each, by addressing the "Commissioner of Patents, Washington, D. C."